E. M. HEYLMAN.
PLOW.
APPLICATION FILED OCT. 17, 1919.
1,386,869.
Patented Aug. 9, 1921.
2 SHEETS—SHEET 1.
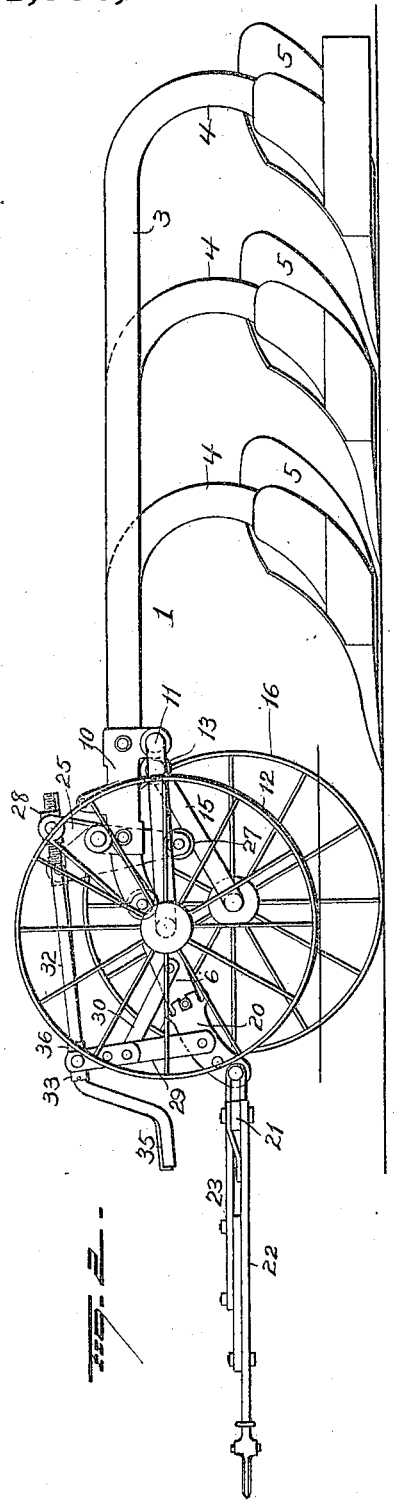
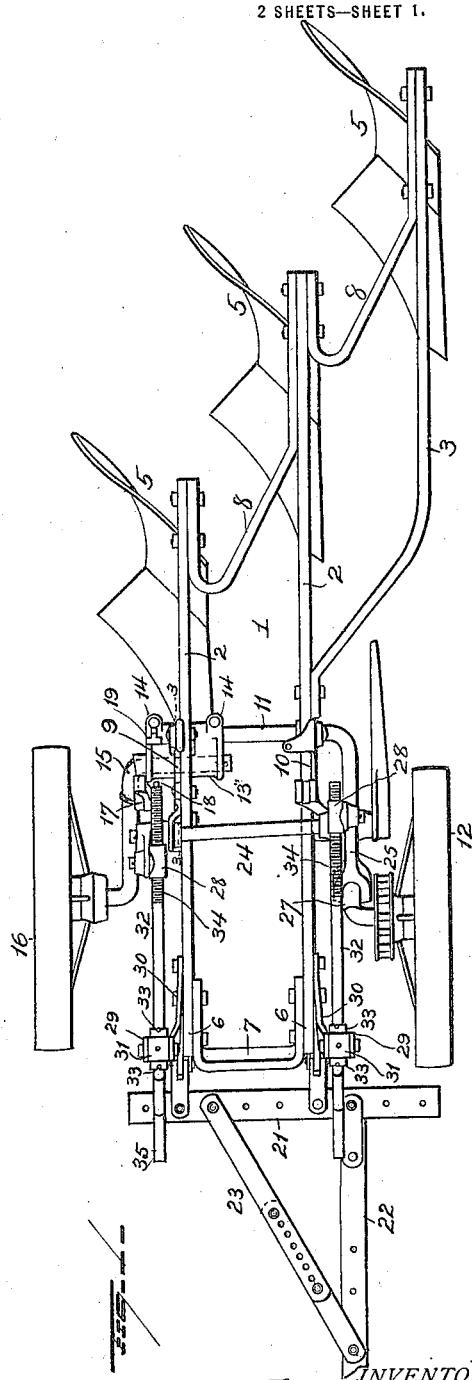
INVENTOR
E. M. Heylman
By Seymour & Bright
Attorneys E. M. HEYLMAN.
PLOW.
APPLICATION FILED OCT. 17, 1919.
1,386,869.
Patented Aug. 9, 1921.
2 SHEETS—SHEET 2.
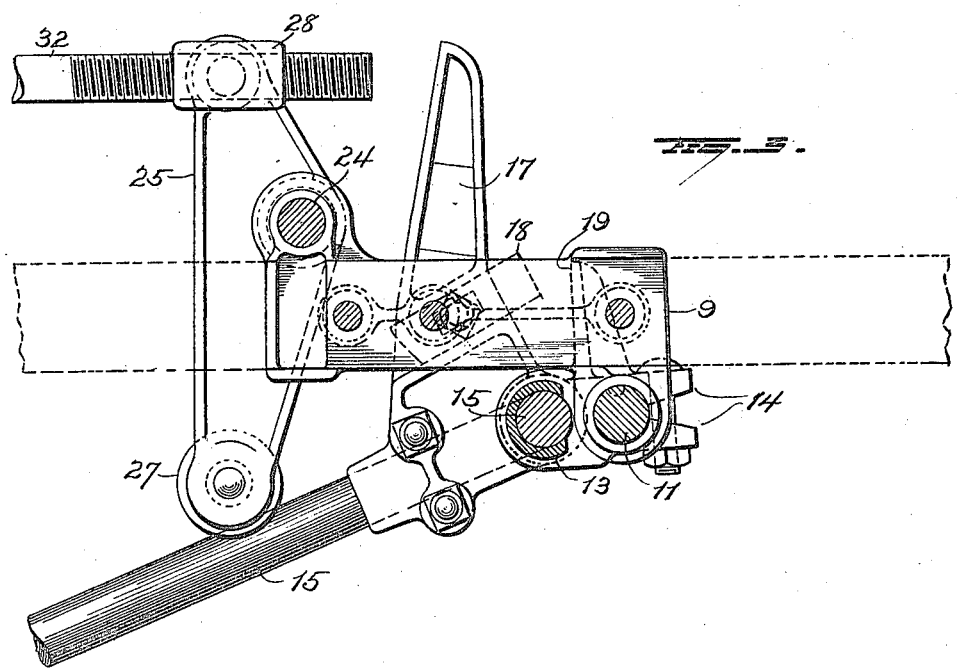
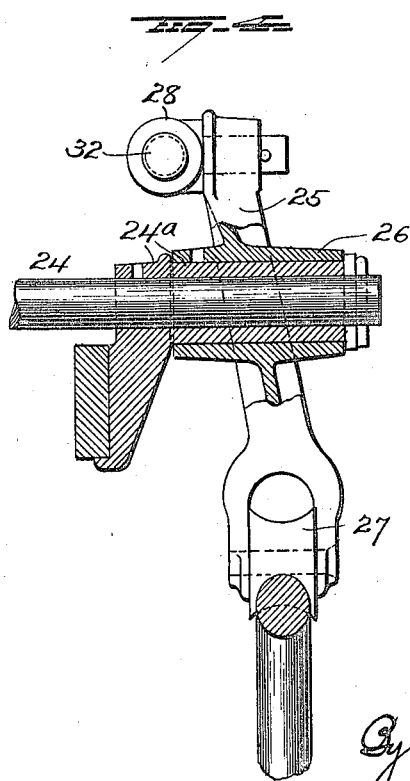
INVENTOR
E. M. Heylman
By Seymour & Bright
Attorneys

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

PLOW.

1,386,869.     Specification of Letters Patent.     Patented Aug. 9, 1921.

Application filed October 17, 1919. Serial No. 331,233.

*To all whom it may concern:*

Be it known that I, EDWARD M. HEYLMAN, a citizen of the United States, and a resident of South Bend, in the county of St. Joseph and State of Indiana, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to depth adjusting or regulating means for power-lift tractor-drawn plows, one object of the invention being to provide depth adjusting means which shall be so constructed that no part of the same will project appreciably above the plow frame, whereby said adjusting or regulating mechanism shall be adaptable for use with a plow to be worked in an orchard where upwardly projecting adjusting levers on a plow would interfere with the plowing operation by conflict with the limbs of trees.

With this and other objects in view, the invention consists in certain novel features of construction and combinations of parts as hereinafter set forth and pointed out in the claims.

In the accompanying drawings; Figure 1 is a plan view of a plow embodying my improvements; Fig. 2 is a side elevation; Fig. 3 is an enlarged section on the line 3—3 of Fig. 1, and Fig. 4 is a sectional view showing one of the levers 25 and its mounting.

1 represents a plow frame comprising beams 2, 2, 3 provided at their rear ends with standards 4, to which plow bases 5 are secured. The forward ends of the beams 2, 2 are bent downwardly as at 6 and are spaced apart by a cross bar 7 and the rear ends of the beams are spaced apart by braces 8.

Bearing brackets 9—10 are secured to the respective beams 2—2 and provide mountings for a land-wheel axle 11, the spindle portion entering the hub of a land wheel 12. A bearing sleeve 13 is secured to the crank axle 11,—said sleeve being provided with lugs 14 clamped to said axle 11 and preferably also keyed thereto. A furrow-wheel crank-axle 15 is mounted in the bearing sleeve 13 and its spindle portion enters the hub of a furrow wheel 16. An arm 17 is secured to the crank axle 15 and carries a member 18 to be engaged by an arm 19 on one of the lugs of the bearing sleeve 13, said arm being, in effect, thus secured to the crank axle 11. When the plow frame is being raised and the crank axle 11 caused to turn, engagement of the arm 19 with the member 18 on arm 17, will cause the crank axle 15 to turn also.

Clevises 20 are adjustably secured to the downwardly bent forward ends of the beams 2—2 of the plow frame, and with these clevises, a hitch bar 21 is connected. A draw bar 22 for attachment to a tractor, is connected with the hitch bar and an adjustable brace 23 is provided for said draw bar.

A shaft 24 is mounted in suitable bearings 24ª on the brackets 9—10, said shaft being disposed transversely of the plow frame and projecting beyond the beams 2—2 thereof. Near respective ends of the shaft 24, levers 25 are loosely mounted on the bearings 24ª, each of said levers being made, intermediate of its ends, with a hub 26 mounted on the shaft and the lower arm of each lever is bifurcated and carries a roller 27 to engage the crank of the adjacent crank axle. The upper arm of each lever 25 carries an internally threaded sleeve 28,—said sleeve being swiveled or pivotally connected to the lever. Standards 29 are connected with the forward portion of the frame, preferably to the clevises attached to said frame, and are braced as at 30. Sleeves 31 are pivotally supported at the upper end of the standards 29, and in these sleeves, approximately horizontal shafts 32 are mounted to turn freely, but said shafts are prevented from longitudinal movement by means of collars 33. These shafts are threaded, as at 34, and pass through the threaded sleeves 28 at the upper ends of the levers 25, and the forward ends of said shafts are provided with crank handles 35 whereby they may be manually operated.

It will be apparent that by turning the shafts 32, the levers 25 will be turned on their pivotal connections with the shaft 24 and as the rollers carried by the lower ends of said levers bear upon the cranks of the axles 11 and 15, the plow frame will be raised or lowered more or less to regulate the depth which the plow bases carried by said frame will enter the ground and thus the plow may be adjusted or regulated for depth of plowing. The respective screw shafts 32 may be so manipulated as to level the plow.

With the use of my improvements, the operating or controlling devices for the depth adjusting means are located close to the frame, and hence are not liable to conflict with the limbs of trees, as would occur with upwardly projecting control levers such as have been heretofore proposed. This is an important consideration in an orchard plow.

Having fully described my invention what I claim as new and desire to secure by Letters-Patent, is:—

1. In a plow, the combination with a plow frame, a plow base carried thereby, a crank axle, and wheels, of a lever pivotally mounted on the plow frame and having its lower end disposed over the crank arm of the axle without direct connection thereto, an approximately horizontal manually operable shaft having threaded and pivotal connection with said lever, and a support on the plow frame for said shaft.

2. In a plow, the combination with a plow frame, a plow base carried thereby, a crank axle, and wheels, of a lever pivotally mounted on the plow frame and having its lower end disposed over the crank arm of said axle without direct connection thereto, an internally threaded sleeve pivotally connected with said lever, an approximately horizontal manually operable shaft having a threaded portion passing through said sleeve, a support on the frame, and means constituting a swiveled connection between said shaft and said support.

3. In a plow, the combination with a plow frame, a plow base carried thereby, a crank axle, and wheels, of a lever having pivotal connection between its ends with the frame, said lever having its lower end disposed over the crank arm of said axle without direct connection thereto, an internally threaded sleeve having pivotal connection with the upper end of said lever, a standard on the frame, a sleeve pivoted to said standard, and a manually operable shaft mounted in said last-mentioned sleeve and having a threaded portion passing through the internally threaded sleeve at the upper end of said lever.

4. In a plow, the combination with a plow frame, a plow base carried thereby, two independently movable crank axles, and wheels on said crank axles, of levers pivotally mounted between their ends at respective sides of the frame, said levers carrying rollers at their lower ends to engage the crank arms of the respective axles, internally threaded sleeves pivoted to the upper ends of said levers, standards near the forward end of the frame at respective sides thereof, sleeves pivoted to said standards, and manually operable shafts mounted to turn in said last mentioned sleeves and having threaded portions passing through the sleeves at the upper ends of said levers.

In testimony whereof, I have signed this specification in the presence of two subscribing witnesses.

EDWARD M. HEYLMAN.

Witnesses:
EDWIN NICAR,
GEORGE R. LANPHERE.